(12) United States Patent
Nemoto

(10) Patent No.: US 11,331,956 B2
(45) Date of Patent: May 17, 2022

(54) PNEUMATIC TIRE

(71) Applicant: The Yokohama Rubber Co., LTD., Tokyo (JP)

(72) Inventor: Masayuki Nemoto, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 286 days.

(21) Appl. No.: 16/613,777

(22) PCT Filed: Apr. 10, 2018

(86) PCT No.: PCT/JP2018/015133
§ 371 (c)(1),
(2) Date: Nov. 14, 2019

(87) PCT Pub. No.: WO2018/235400
PCT Pub. Date: Dec. 27, 2018

(65) Prior Publication Data
US 2020/0148008 A1    May 14, 2020

(30) Foreign Application Priority Data
Jun. 19, 2017   (JP) .............................. JP2017-119821

(51) Int. Cl.
*B60C 11/03* (2006.01)
*B60C 11/12* (2006.01)
(Continued)

(52) U.S. Cl.
CPC .......... *B60C 11/1236* (2013.01); *B60C 11/24* (2013.01); *B60C 13/001* (2013.01);
(Continued)

(58) Field of Classification Search
CPC ..... B60C 2011/0353; B60C 2011/0339; B60C 2011/0348
See application file for complete search history.

(56) References Cited

U.S. PATENT DOCUMENTS

2008/0142133 A1    6/2008   Ochi
2010/0212792 A1    8/2010   Mita
(Continued)

FOREIGN PATENT DOCUMENTS

CN    101890881    11/2010
CN    106794717     5/2017
(Continued)

OTHER PUBLICATIONS

International Search Report for International Application No. PCT/JP2018/015133 dated Jun. 26, 2018, 4 pages, Japan.

*Primary Examiner* — Cedrick S Williams
(74) *Attorney, Agent, or Firm* — Thorpe North & Western

(57) ABSTRACT

A pneumatic tire includes a first main groove in a circumferential direction outward of an equatorial plane in a vehicle width direction, a second main groove in the circumferential direction at a position closer to the equatorial plane than the first main groove, a third main groove in the circumferential direction at a position inward of the equatorial plane in the vehicle width direction, and a fourth main groove in the circumferential direction at a position farther from the equatorial plane than the third main groove; relationships $1.05 \leq G1/G3 \leq 1.25$, $1.20 \leq G2/G3 \leq 1.40$, and $1.10 \leq G4/G3 \leq 1.30$ are satisfied; and relationships $G3<G1<G2$ and $G3<G1<G4$ are satisfied, where G1 is a first main groove width, G2 is a second main groove width, G3 is a third main groove width, and G4 is a fourth main groove width.

14 Claims, 3 Drawing Sheets

(51) Int. Cl.
*B60C 11/24* (2006.01)
*B60C 13/00* (2006.01)
*B60C 19/00* (2006.01)

(52) U.S. Cl.
CPC ..... *B60C 19/001* (2013.01); *B60C 2011/0353* (2013.01); *B60C 2011/0355* (2013.01); *B60C 2200/04* (2013.01)

(56) References Cited

U.S. PATENT DOCUMENTS

| | | | |
|---|---|---|---|
| 2010/0263775 A1* | 10/2010 | Watanabe | B60C 11/12 152/209.8 |
| 2013/0112325 A1 | 5/2013 | Mukai | |
| 2013/0167995 A1 | 7/2013 | Hada | |
| 2014/0305559 A1 | 10/2014 | Takemoto | |
| 2016/0144664 A1* | 5/2016 | Kimura | B60C 11/0327 152/209.22 |
| 2016/0144665 A1 | 5/2016 | Koishikawa | |
| 2016/0332489 A1 | 11/2016 | Sanae | |
| 2017/0282651 A1 | 10/2017 | Suzuki et al. | |
| 2017/0305198 A1 | 10/2017 | Ichimura | |
| 2018/0207991 A1 | 7/2018 | Shibai | |

FOREIGN PATENT DOCUMENTS

| | | | | |
|---|---|---|---|---|
| JP | H03-136909 | 6/1991 | | |
| JP | H06-016106 | 3/1994 | | |
| JP | 2009-149124 | 7/2009 | | |
| JP | 2010254049 A | * 11/2010 | ......... | B60C 11/0304 |
| JP | 2011-255845 | 12/2011 | | |
| JP | 2013-139167 | 7/2013 | | |
| JP | 5695476 | 4/2015 | | |
| JP | 2016-074386 | 5/2016 | | |
| JP | 2016-097777 | 5/2016 | | |
| JP | 2016-210342 | 12/2016 | | |
| JP | 2017-030556 | 2/2017 | | |
| JP | 2017-056941 | 3/2017 | | |
| WO | WO 2006/033383 | 3/2006 | | |
| WO | WO 2015/005194 | 1/2015 | | |
| WO | WO 2016/035659 | 3/2016 | | |
| WO | WO 2016/056505 | 4/2016 | | |
| WO | WO 2017/022308 | 2/2017 | | |

* cited by examiner

PNEUMATIC TIRE

TECHNICAL FIELD

The present technology relates to a pneumatic tire.

BACKGROUND ART

There is a demand for known pneumatic tires to provide, in a compatible manner, steering stability on dry and wet road surfaces and noise performance related to pass-by nose. As known pneumatic tires related to such a demand, technologies described in International Patent Publication WO 2015/005194 and Japan Patent No. 5695476 are known.

The pneumatic tires described in International Patent Publication WO 2015/005194 and Japan Patent No. 5695476 have room for improvement in the case of providing, in a compatible manner, steering stability on dry and wet road surfaces and noise performance related to pass-by noise.

SUMMARY

The present technology provides a pneumatic tire that can provide the steering stability performance on dry and wet road surfaces and the noise performance in a highly compatible manner.

An aspect of the present technology provides a pneumatic tire including a mounting direction indicator portion indicating a mounting direction of a tire with respect to a vehicle; and a tread surface in which an outer side and an inner side in a vehicle width direction are asymmetric with respect to a tire equatorial plane; the tread surface including a first main groove extending in a tire circumferential direction at a position outward of the tire equatorial plane in the vehicle width direction, a second main groove extending in the tire circumferential direction at a position closer to the tire equatorial plane than the first main groove, a third main groove extending in the tire circumferential direction at a position inward of the tire equatorial plane in the vehicle width direction, and a fourth main groove extending in the tire circumferential direction at a position farther from the tire equatorial plane than the third main groove; relationships $1.05 \leq G1/G3 \leq 1.25$, $1.20 \leq G2/G3 \leq 1.40$, and $1.10 \leq G4/G3 \leq 1.30$ being satisfied; and relationships $G3 < G1 < G2$ and $G3 < G1 < G4$ being satisfied, where G1 is a groove width of the first main groove, G2 is a groove width of the second main groove, G3 is a groove width of the third main groove, and G4 is a groove width of the fourth main groove.

Additionally, the groove width G2 of the second main groove and the groove width G4 of the fourth main groove preferably have a relationship $G4 < G2$.

The groove width G1 of the first main groove, the groove width G2 of the second main groove, and the groove width G3 of the third main groove preferably have a relationship $(G2-G1)/G3 \geq 0.01$.

For a width of an outer land portion between the first main groove and the second main groove, a width of a central land portion between the second main groove and the third main groove, and a width of an inner land portion between the third main groove and the fourth main groove, a ratio of a maximum width to a minimum width is preferably less than or equal to 1.05.

For a width of an outer land portion between the first main groove and the second main groove, a width of a central land portion between the second main groove and the third main groove, and a width of an inner land portion between the third main groove and the fourth main groove, at least one of the widths may preferably be different from the other widths.

Preferably, the pneumatic tire further includes a first narrow groove extending in the tire circumferential direction at a position further inward than the fourth main groove in the vehicle width direction, and a groove width Gs of the first narrow groove and the groove width G3 of the third main groove have a relationship $0.10 \leq Gs/G3 \leq 0.30$.

Preferably, the pneumatic tire further includes a second narrow groove provided in the inner land portion and extending in the tire circumferential direction, and a groove width Gr of the second narrow groove and the groove width G3 of the third main groove have a relationship $0.10 \leq Gr/G3 \leq 0.30$.

In the inner land portion, the second narrow groove is preferably provided at a position where a ratio of a distance from the third main groove to a length of the inner land portion in the vehicle width direction is more than or equal to 0.15 and less than or equal to 0.30.

The pneumatic tire preferably further includes a first lug groove at a first end opening to the second narrow groove and at a second end opening to the fourth main groove.

Preferably, the first lug groove has a groove width varying between the first end and the second end, and a relationship between a groove width W1 on the first end side and a groove width W2 on the second end side is in the range $0.20 \leq W1/W2 \leq 0.60$.

The pneumatic tire preferably further includes a second lug groove at a first end opening to the first main groove and at a second end extending outward in the vehicle width direction; and a sipe at a first end connected to the second end of the second lug groove and at a second end extending outward in the vehicle width direction.

Preferably, the pneumatic tire further includes a third lug groove extending outward in the vehicle width direction from a position further outward than the first main groove in the vehicle width direction; and a fourth lug groove extending inward in the vehicle width direction from a position further inward than the fourth main groove in the vehicle width direction, the third lug groove does not open to the first main groove, and the fourth lug groove does not open to the fourth main groove.

A distance from the tire equatorial plane to the second main groove is preferably shorter than a distance from the tire equatorial plane to the third main groove.

A pneumatic tire according to an embodiment of the present technology can provide steering stability on dry and wet road surfaces and noise performance in a highly compatible manner.

DETAILED DESCRIPTION

Pneumatic tires according to embodiments of the present technology will be described in detail below with reference to the drawings. However, the present technology is not limited by the embodiments. Moreover, constituents of the embodiments include elements that are substitutable while maintaining consistency with the technology; and obviously substitutable elements. Furthermore, the modified examples described in the embodiments can be combined as desired within the scope apparent to one skilled in the art.

Pneumatic Tire

Figure 1:
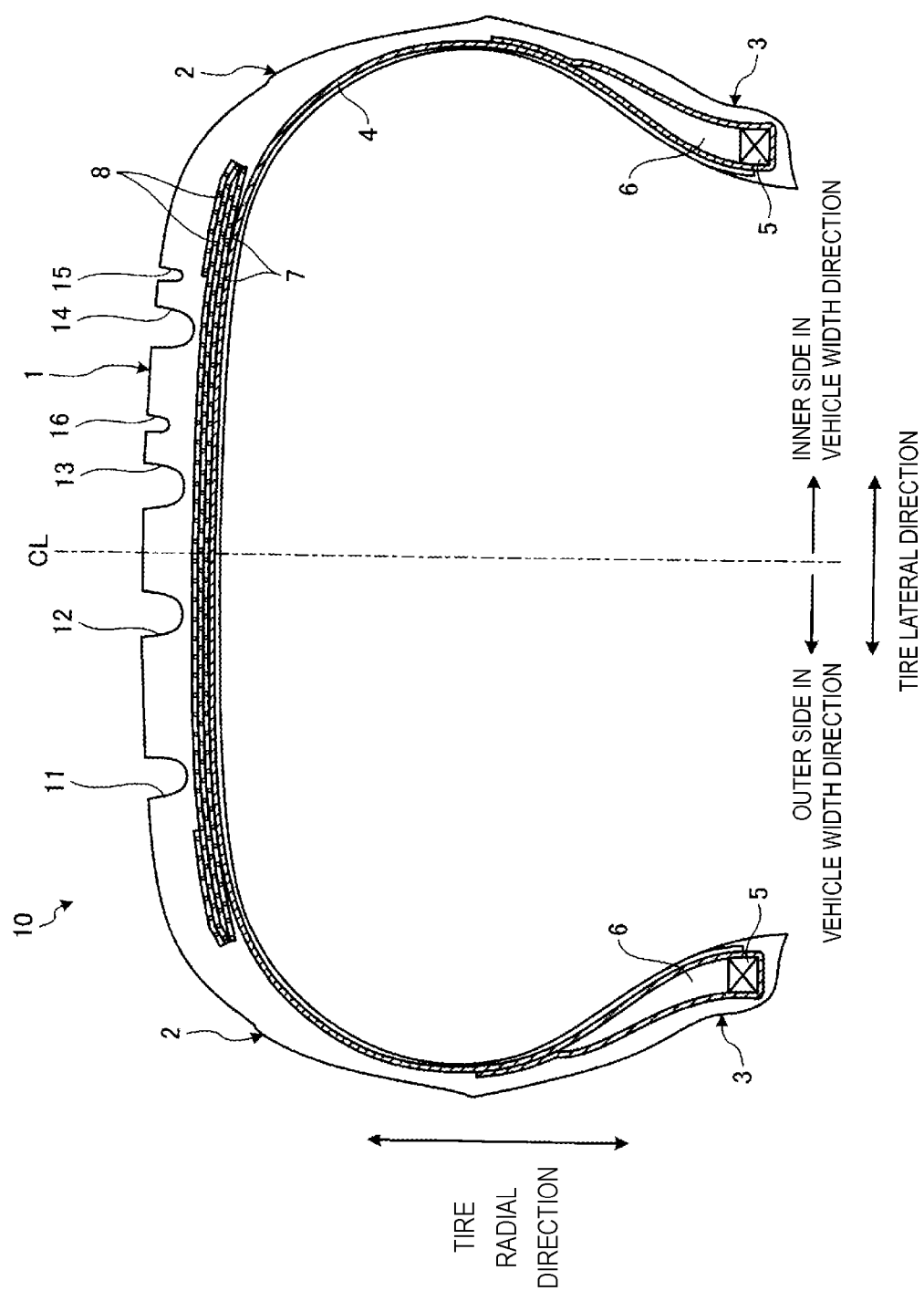
FIG. 1 is a meridian cross-sectional view illustrating a pneumatic tire according to an embodiment of the present technology.

FIG. 1 is a cross-sectional view in a tire meridian direction illustrating a pneumatic tire according to an embodiment of the technology. FIG. 1 illustrates a cross-sectional view of a half region in the tire radial direction. FIG. 1 also illustrates a radial tire for a passenger vehicle as an example of the pneumatic tire 1.

Herein, "tire radial direction" refers to the direction orthogonal to the rotation axis (not illustrated) of a pneumatic tire 10. "Inward in the tire radial direction" refers to the direction toward the rotation axis in the tire radial direction. "Outward in the tire radial direction" refers to the direction away from the rotation axis in the tire radial direction. Additionally, "tire circumferential direction" refers to the circumferential direction with the rotation axis as the center axis. In addition, "tire lateral direction" refers to the direction parallel to the rotation axis. "Inward in the tire lateral direction" refers to the direction toward the tire equatorial plane CL in the tire lateral direction, and "outward in the tire lateral direction" refers to the direction away from the tire equatorial plane CL in the tire lateral direction. "Tire equatorial plane CL" refers to a plane that is orthogonal to the rotation axis of the pneumatic tire 10 and that passes through the center of the tire width of the pneumatic tire 10. "Tire width" is the width in the tire lateral direction between components located outward in the tire lateral direction or, in other words, the distance between the components that are the most distant from the tire equatorial plane CL in the tire lateral direction. "Tire equator line" refers to a line lying on the tire equatorial plane CL and extending along the tire circumferential direction of the pneumatic tire 10. In the present embodiment, the tire equator line and the tire equatorial plane are denoted by the same reference sign CL.

In reference to the same drawing, "cross section in a tire meridian direction" refers to a cross section of the tire taken along a plane that includes the tire rotation axis (not illustrated). Reference sign CL denotes the tire equatorial plane and refers to a plane that is perpendicular to the tire rotation axis and that passes through the center point of the tire in the tire rotation axis direction. "Tire lateral direction" refers to the direction parallel with the tire rotation axis. "Tire radial direction" refers to the direction perpendicular to the tire rotation axis.

Furthermore, the inner side in the vehicle width direction and the outer side in the vehicle width direction are defined with respect to the vehicle width direction when the tire is mounted on the vehicle. Specifically, the pneumatic tire 10 includes a mounting direction indicator portion (not illustrated) indicating the mounting direction with respect to a vehicle. The mounting direction indicator portion, for example, is constituted of a mark or ridges/grooves on a sidewall portion of the tire. For example, Economic Commission for Europe Regulation 30 (ECE R30) requires that a mounting direction indicator portion be provided on the sidewall portion, corresponding to the outer side in the vehicle width direction in a case where the tire is mounted on the vehicle.

As illustrated in FIG. 1, the pneumatic tire 10 of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction is set to range from, for example, 10° to 40°. Steel cords are preferably used as the reinforcing cords of the belt layers 7. To improve high-speed durability, at least one belt cover layer 8, formed by arranging reinforcing cords at an angle of, for example, less than or equal to 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

Tread Portion

Figure 2:
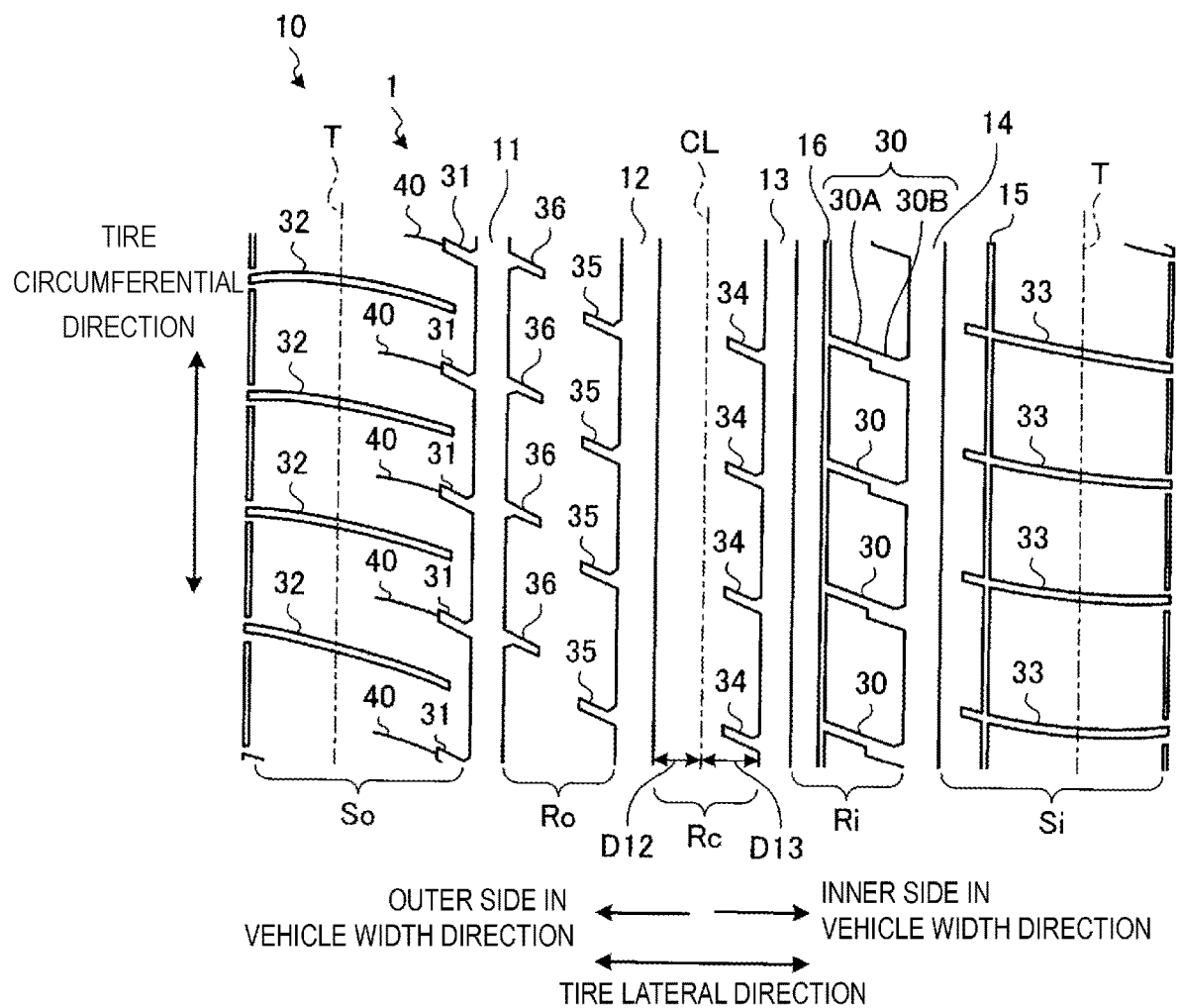
FIG. 2 is a developed view illustrating a tread pattern of a pneumatic tire according to an embodiment of the present technology.
Figure 3:
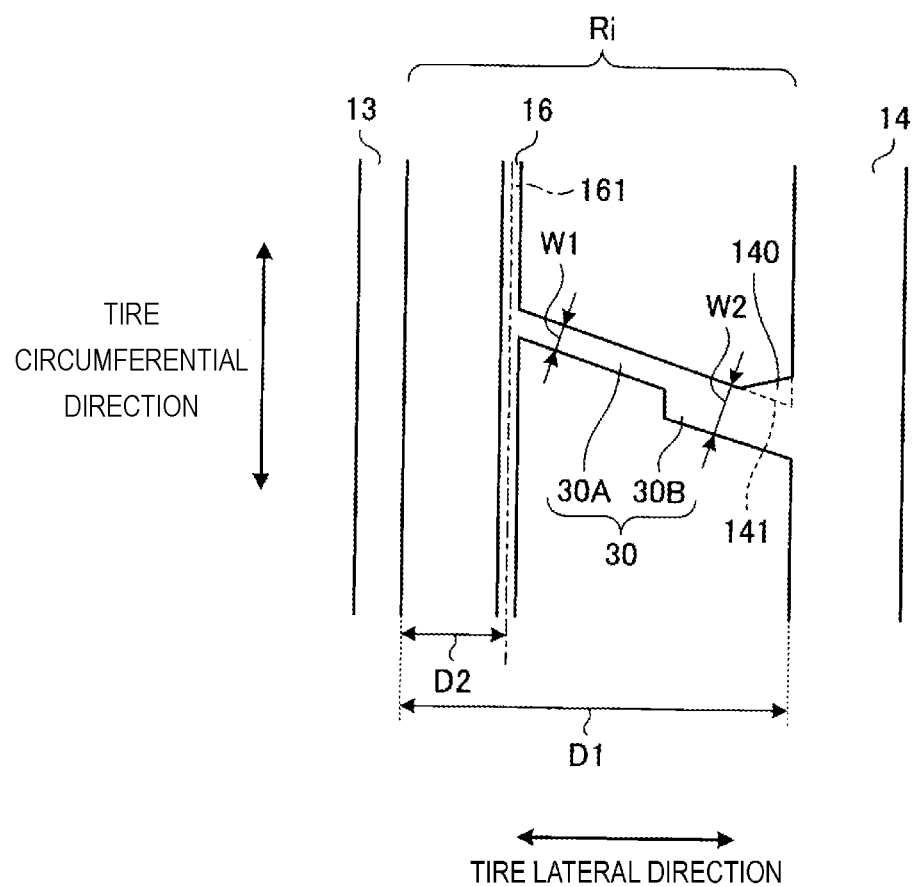
FIG. 3 is a partially enlarged view of the tread pattern of FIG. 2.

FIG. 2 is a developed view illustrating a tread pattern of the pneumatic tire 10 illustrated in FIG. 1. FIG. 3 is a partially enlarged view of the tread pattern of FIG. 2. In FIG. 2, reference sign T denotes a ground contact edge.

As illustrated in FIG. 2, the pneumatic tire 10 includes the tread portion 1 including a first main groove 11 extending in the tire circumferential direction at a position outward of the tire equatorial plane CL in the vehicle width direction, a second main groove 12 extending in the tire circumferential direction at a position closer to the tire equatorial plane CL than the first main groove 11, a third main groove 13 extending in the tire circumferential direction at a position inward of the tire equatorial plane CL in the vehicle width direction, and a fourth main groove 14 extending in the tire circumferential direction at a position farther from the tire equatorial plane CL than the third main groove 13.

A groove width of the first main groove 11 is denoted as $G1$, a groove width of the second main groove 12 is denoted as $G2$, a groove width of the third main groove 13 is denoted as $G3$, and a groove width of the fourth main groove 14 is denoted as $G4$. Then, the groove widths preferably have the following relationships:

$$1.05 \leq G1/G3 \leq 1.25,$$

$$1.20 \leq G2/G3 \leq 1.40, \text{ and}$$

$$1.10 \leq G4/G3 \leq 1.30.$$

Additionally, the groove width $G1$ of the first main groove 11, the groove width $G2$ of the second main groove 12, and the groove width $G3$ of the third main groove 13 preferably have the relationships $G3<G1<G2$ and $G3<G1<G4$. Furthermore, the groove width $G2$ of the second main groove 12 and the groove width $G4$ of the fourth main groove 14 preferably have the relationship $G4<G2$. In other words, preferably, the groove width $G1$ of the first main groove 11, the groove width G2 of the second main groove 12, the groove width G3 of the third main groove 13, and the groove width G4 of the fourth main groove 14 differ from one another. By making the circumferential width of each main groove different from the circumferential widths of all the other main grooves to vary resonance of air passing through the tire grooves, air column resonance can be perturbed to improve noise performance. Having the relationship G3<G1<G4<G2 is preferable for improving the noise performance.

The groove width G1 of the first main groove 11, the groove width G2 of the second main groove 12, and the groove width G3 of the third main groove 13 preferably have the relationship (G2−G1)/G3≥0.01. In other words, the ratio (G2−G1)/G3 of the difference between the groove width G1 and the groove width G2 to the groove width G3 is preferably more than or equal to 0.01. The groove width on the outer side in the tire lateral direction is narrower than the groove width on the center side close to the tire equatorial plane CL. This is effective for reducing vehicle pass-by noise without sacrificing wet steering stability performance.

Note that, as illustrated in FIG. 2, in the pneumatic tire 10, a distance D12 from the tire equatorial plane CL to the second main groove 12 is shorter than a distance D13 from the tire equatorial plane CL to the third main groove 13. That is, the ratio of the distance D12 to the distance D13 is D12/D13<1.0. Thus, the pneumatic tire 10 includes a tread surface in which an outer side and an inner side in the vehicle width direction are asymmetric with respect to the tire equatorial plane CL.

The first main groove 11, the second main groove 12, the third main groove 13, and the fourth groove 14 are each a "circumferential groove" with a wear indicator indicating the terminal stage of wear and typically have a groove width of more than or equal to 5.0 mm and a groove depth of more than or equal to 7.5 mm. Note that the groove width and groove depth of the first main groove 11, the second main groove 12, the third main groove 13, and the fourth main groove 14 are not limited to the ranges described above.

Additionally, "lug groove", described below, refers to a lateral groove having a groove width of more than or equal to 2.0 mm and a groove depth of more than or equal to 3.0 mm. Additionally, "sipe", described below, refers to a cut formed in a land portion and typically having a groove width of less than 1.5 mm.

Land Portion, Lug Groove, and Narrow Groove

The tread portion 1, provided with the first main groove 11, the second main groove 12, the third main groove 13, and the fourth main groove 14, is thus divided into a plurality of land portions. Specifically, the tread portion 1 includes an outer shoulder land portion So positioned further outward than the first main groove 11 in the vehicle width direction, an outer land portion Ro between the first main groove 11 and the second main groove 12, a central land portion Rc between the second main groove 12 and the third main groove 13, an inner land portion Ri between the third main groove 13 and the fourth main groove 14, and an inner shoulder land portion Si positioned further inward than the fourth main groove 14 in the vehicle width direction.

The outer shoulder land portion So of the tread portion 1 includes second lug grooves 31 each at a first end opening to the first main groove 11 and at a second end extending outward in the vehicle width direction; sipes 40 each at a first end connected to the second end of the second lug groove 31 and at a second end extending outward in the vehicle width direction; and third lug grooves 32 extending outward in the vehicle width direction from a position further outward than the first main groove 11 in the vehicle width direction. The second lug grooves 31 and the sipes 40 are provided at regular intervals in the tire circumferential direction. By providing the sipes 40, steering stability performance on wet road surfaces can be effectively ensured without any reduction in the rigidity of the outer shoulder land portion So. The third lug grooves 32 are provided at regular intervals in the tire circumferential direction. Note that the third lug grooves 32 do not open to the first main grooves 11. Improved noise performance can be contributed to by preventing the third lug grooves 32 of the outer shoulder land portion So from communicating with the first main groove 11.

In the tread portion 1, the outer land portion Ro includes sixth lug grooves 35 each at a first end opening to the second main groove 12 and seventh lug grooves 36 each at a first end opening to the first main groove 11. The sixth lug grooves 35 are provided at regular intervals in the tire circumferential direction. The seventh lug grooves 36 are provided at regular intervals in the tire circumferential direction. Each of the sixth lug grooves 35 at a second end terminates in the outer land portion Ro. Each of the seventh lug grooves 36 at a second end terminates in the outer land portion Ro. In the outer land portion Ro, the sixth lug grooves 35 and the seventh lug grooves 36 are alternately provided in the tire circumferential direction.

Note that the sixth lug groove 35 may or may not include a notch portion at the first end opening to the second main groove 12. The seventh lug groove 36 may or may not include a notch portion at the first end opening to the first main groove 11.

The central land portion Rc of the tread portion 1 includes fifth lug grooves 34 each at a first end opening to the third main groove 13. The fifth lug groove 34 may or may not include a notch portion at the first end opening to the third main groove 13. The fifth lug grooves 34 are provided in regular intervals in the tire circumferential direction. The fifth lug groove 34 at a second end terminates in the central land portion Rc. The terminating second end of the fifth lug groove 34 does not traverse the equatorial plane CL.

The inner land portion Ri of the tread portion 1 includes a second narrow groove 16 extending in the tire circumferential direction; and first lug grooves 30 each at a first end opening to the second narrow groove 16 and at a second end opening to the fourth main groove 14. By disposing, on the inner side in the vehicle width direction, the second narrow groove 16 extending in the tire circumferential direction, the rigidity of the laterally outer land portion can be ensured, and ensuring of steering stability and improvement in drainage properties can be achieved in a compatible manner. The first lug grooves 30 communicate with the second narrow groove 16 and the fourth main groove 14. The first lug grooves 30 are provided at regular intervals in the tire circumferential direction. The groove width Gr of the second narrow groove 16 and the groove width G3 of the third main groove 13 preferably have the relationship 0.10≤Gr/G3≤0.30. Steering stability can be ensured by disposing, in the inner land portion Ri on the inner side in the vehicle width direction, the first lug grooves 30 extending in the tire lateral direction. Furthermore, the drainage properties can be ensured by communication between the second narrow groove 16 and the fourth main groove 14 through the first lug grooves 30.

The inner shoulder land portion Si of the tread portion 1 includes a first narrow groove 15 extending in the tire circumferential direction at a position further inward than the fourth main groove 14 in the vehicle width direction; and fourth lug grooves 33 extending inward in the vehicle width direction from a position further inward than the fourth main groove 14 in the vehicle width direction. The groove width Gs of the first narrow groove 15 and the groove width G3 of the third main groove 13 preferably have the relationship $0.10 \leq Gs/G3 \leq 0.30$. Note that the fourth lug grooves 33 do not open to the fourth main groove 14. Improved noise performance can be contributed to by preventing the fourth lug grooves 33 in the inner shoulder land portion Si from communicating with the fourth main groove 14.

Additionally, for the width of the outer land portion Ro, the width of the central land portion Rc, and the width of the inner land portion Ri, the ratio of the maximum width to the minimum width is preferably less than or equal to 1.05. The ratio of less than or equal to 1.05 means that the width of the outer land portion Ro, the width of the central land portion Rc, and the width of the inner land portion Ri are substantially the same. Substantially the same width of the land portions leads to even rigidity of the land portions. Thus, uneven wear durability performance is improved, and the uniformity of the pneumatic tire 10 can be improved.

However, for the width of the outer land portion Ro between the first main groove 11 and the second main groove 12, the width of the central land portion Rc between the second main groove 12 and the third main groove 13, and the width of the inner land portion Ri between the third main groove 13 and the fourth main groove 14, each of the widths may differ from all the other widths or each of the widths may be the same as any of the other widths. At least one of the width of the outer land portion Ro, the width of the central land portion Rc, and the width of the inner land portion Ri may differ from the other widths. With the different widths of the land portions, adjustment of the widths of the land portions allows handling performance to be adjusted in a case where a camber angle in the vehicle is set to an angle other than 0 degrees.

In FIG. 3, the length of the inner land portion in the vehicle width direction is denoted as D1, and a distance from an inner end portion of the third main groove 13 in the vehicle width direction to a center line 161 of the second narrow groove 16 is denoted as D2. The ratio of the distance D2 to the length D1 is preferably more than or equal to 0.15 and less than or equal to 0.30. In other words, the second narrow groove 16 is preferably provided at a position where the ratio of the distance D2 from the third main groove 13 to the length D1 of the inner land portion Ri in the vehicle width direction is preferably more than or equal to 0.15 and less than or equal to 0.30. Disposing the second narrow groove 16 in this range allows an appropriate rigidity of the inner land portion Ri to be ensured.

The first lug groove 30 includes a first groove portion 30A and a second groove portion 30B. A groove width W1 of the first groove portion 30A is smaller than a groove width W2 of the second groove portion 30B. The groove width W1 has the maximum value of the groove width of the first groove portion 30A. The groove width W2 has the maximum value of the groove width of the second groove portion 30B. Note that, with a notch portion 140 excluded, the groove width W2 is measured with reference to an imaginary line 141 obtained by extending a groove wall.

As illustrated in FIG. 3, the groove width of the first lug groove 30 varies between the first end opening to the second narrow groove 16 and the second end opening to the fourth main groove 14. For the first lug groove 30, the relationship between the groove width W1 on the first end side and the groove width W2 on the second end side is preferably in the range $0.20 \leq W1/W2 \leq 0.60$. In other words, in the first lug groove 30, the groove width of the portion close to the inner side in the vehicle width direction is larger than the groove width of the portion close to the tire equatorial plane CL. By increasing the groove width of the first lug groove 30 on the inner side in the vehicle width direction, water drainage properties can be effectively improved.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, in a cross-sectional view normal to the groove length direction. Additionally, in a configuration in which the grooves extend in a zigzag-like or wave-like manner in the tire circumferential direction, the groove width is measured with reference to the center line of the amplitude of the groove walls.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

EXAMPLES

Tables 1 to 3 indicate the results of performance tests of pneumatic tires according to embodiments of the technology. In the performance tests, different pneumatic tires were evaluated for dry steering stability performance, wet steering stability performance, and noise performance. In these performance tests, test tires having a size of 225/60R18 100H were mounted on rims having a rim size of 17×7.5 JJ and inflated to an air pressure of 240 kPa. Additionally, as a test vehicle, a front engine front drive (FF) sport utility vehicle (SUV) with an engine displacement of 2400 cc was used.

In the evaluation for the dry steering stability performance, the test vehicle was driven on a dry road surface test course with flat circuits at a speed of from 60 km/h to 100 km/h. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

In the evaluation for the wet steering stability, the test vehicle was driven on an asphalt road surface covered with 1 mm of water at 40 km/h. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

The evaluation for the noise performance is based on the magnitude of exterior pass-by noise measured according to the tire noise test method set forth in ECE R117-02 (ECE Regulation No. 117 Revision 2). In this test, the test vehicle starts to be driven at a position sufficiently away from a noise measurement section, the engine is stopped near the section and caused to coast. In this case, the maximum noise level dB (noise level in a frequency range of 800 Hz to 1200 Hz) in the noise measurement section is measured at a plurality of speeds determined by dividing a speed range of ±10 km/h from a reference speed into eight or more portions at substantially regular intervals, and the maximum noise levels are averaged to obtain the exterior pass-by noise. The maximum noise level dB is a sound pressure dB (A) measured through an A-characteristic frequency correction circuit by using a stationary microphone placed at an intermediate point in the noise measurement section at a position 7.5 m from a travel center line in the vehicle width direction and at a height of 1.2 m from the road surface. The pass-by noise is expressed as an index value with the Conventional Example being assigned as the reference (100), and a higher numerical value indicates a smaller sound pressure dB and superior noise performance against pass-by noise.

In the pneumatic tires according to Examples 1 to 21, the groove width G1 of the first main groove 11, the groove width G2 of the second main groove 12, the groove width G3 of the third main groove 13, and the groove width G4 of the fourth main groove 14 have the relationships $1.05 \leq G1/G3 \leq 1.25$, $1.20 \leq G2/G3 \leq 1.40$, and $1.10 \leq G4/G3 \leq 1.30$ and further have the relationships $G3<G1<G2$ and $G3<G1<G4$.

Examples 1 to 21 are set as indicated in Tables 1 to 3. In other words, the following tires are prepared: a tire in which the groove width G2 is larger than the groove width G4 and a tire in which the groove width G2 is smaller than the groove width G4; a tire in which, for the width of outer land portion Ro, the width of the central land portion Rc, and the width of the inner land portion Ri, the ratio of the maximum land portion width to the minimum land portion width is less than or equal to 1.05 and a tire in which the ratio of the maximum land portion width to the minimum land portion width is more than 1.05; a tire in which the inner shoulder land portion Si includes a circumferential narrow groove, in other words, the first narrow groove 15 and a tire in which the inner shoulder land portion Si does not include a circumferential narrow groove; tires with a ratio Gs/G3 of 0.10, 0.20, and 0.30; tires with a ratio D2/D1 of 0.15, 0.20, and 0.30; a tire in which the inner land portion Ri includes the first lug grooves 30 and a tire in which the inner land portion Ri does not include the first lug grooves 30; tires with a ratio W1/W2 of 1.00, 0.20, 0.35, 0.50, and 0.60; a tire in which the inner shoulder land portion Si and the outer shoulder land portion So include the third lug grooves 32 and the fourth lug grooves 33 and a tire in which the inner shoulder land portion Si and the outer shoulder land portion So do not include third lug grooves 32 and fourth lug grooves 33; a tire in which the third lug grooves 32 are in communication with the first main groove 11 and in which the fourth lug grooves 33 are in communication with the fourth main groove 14 and a tire in which the third lug grooves 32 are not in communication with the first main groove 11 and in which the fourth lug grooves 33 are not in communication with the fourth main groove 14 (no communication); and a tire in which the outer shoulder land portion So includes sipes and a tire in which the outer shoulder land portion So does not include sipes; In all of the tires, the groove width G1, the groove width G2, and the groove width G3 have the relationship $(G2-G1)/G3 \geq 0.01$.

In the pneumatic tire according to Conventional Example 1, the groove widths G1 to G4 are the same, the outer shoulder land portion So and the inner shoulder land portion Si include a circumferential narrow groove, the inner land portion Ri does not include a circumferential narrow groove, the inner land portion Ri and the outer shoulder land portion So include lug grooves, and the lug grooves are not in communication with the main grooves.

For comparison, pneumatic tires according to Comparative Example 1, Comparative Example 2, and Comparative Example 3 were prepared. In the pneumatic tire according to Comparative Example 1, the groove widths G1 and G4 vary, the outer shoulder land portion So includes a circumferential narrow groove, the inner shoulder land portion Si does not include a circumferential narrow groove, the inner land portion Ri does not include a circumferential narrow groove, the inner shoulder land portion Si and the outer shoulder land portion So include lug grooves, in the inner shoulder land portion Si, the lug grooves are in communication with the main groove, and in the outer shoulder land portion So, the lug grooves are not in communication with the main groove. In the pneumatic tire according to Comparative Example 2, the groove widths G1 to G4 have the relationship $G3<G4<G2<G1$. In the pneumatic tire according to Comparative Example 3, the groove widths G1 to G4 have the relationship $G3<G1=G2=G4$.

These pneumatic tires were evaluated for the dry steering stability performance, the wet steering stability performance, and the noise performance by the evaluation methods described above. The results are also indicated in Tables 1 to 3.

As indicated in Tables 1 to 3, good results were obtained in the following cases in terms of the dry steering stability performance, the wet steering stability performance, and the noise performance: a case where the relationships $1.05 \leq G1/G3 \leq 1.25$, $1.20 \leq G2/G3 \leq 1.40$, and $1.10 \leq G4/G3 \leq 1.30$ are satisfied and further where the relationships $G3<G1<G2$ and $G3<G1<G4$ are satisfied; a case where the groove width G2 is larger than the groove width G4 ($G4<G2$); a case where, for the width of the outer land portion Ro, the width of the central land portion Rc, and the width of the inner land portion Ri, the ratio of the maximum land portion width to the minimum land portion width is less than or equal to 1.05; a case where the inner shoulder land portion Si includes the first narrow groove 15; a case where the ratio Gs/G3 is $0.10 \leq Gs/G3 \leq 0.30$; a case where the inner land portion Ri includes the second narrow groove 16; a case where the ratio Gr/G3 has the relationship $0.10 \leq Gr/G3 \leq 0.30$; a case where the ratio D2/D1 is more than or equal to 0.15 and less than or equal to 0.30; a case where the inner land portion Ri includes the first lug grooves 30; a case where the ratio W1/W2 is in the range $0.20 \leq W/W2 \leq 0.60$; a case where the inner shoulder land portion Si and the outer shoulder land portion So include the third lug grooves 32 and the fourth lug grooves 33; a case where the third lug grooves 32 are not in communication with the first main groove 11 and where the fourth lug grooves 33 are not in communication with the fourth main groove 14; and a case where the outer shoulder land portion So includes sipes.

TABLE 1

| | Conventional Example 1 | Comparative Example 1 | Example 1 |
|---|---|---|---|
| G1/G3 | 1.00 | 0.8 to 1.1 | 1.05 |
| G2/G3 | 1.00 | 1.00 | 1.25 |
| G4/G3 | 1.00 | 0.8 to 1.1 | 1.20 |
| Maximum land portion width/minimum land portion width | — | — | 1.00 |
| Circumferential narrow groove in outer shoulder land portion So | Yes | Yes | No |
| Circumferential narrow groove in inner shoulder land portion Si | Yes | No | No |
| Gs/G3 | — | — | — |
| Circumferential narrow groove in inner land portion Ri | No | No | No |
| Gr/G3 | — | — | — |
| D2/D1 | — | — | — |
| Lug grooves in inner land portion Ri | Yes | Yes | No |
| W1/W2 | — | — | — |
| Lug grooves in shoulder land portions Si and So | Yes | Yes | No |
| Sipes in outer shoulder land portion So | No | No | No |
| Communication/no communication with lug grooves | No communication | Communication/ no communication | — |
| Dry steering stability performance | 100 | 100 | 103 |
| Wet steering stability performance | 100 | 100 | 100 |
| Noise performance | 100 | 100 | 103 |

| | Example 2 | Comparative Example 2 | Comparative Example 3 |
|---|---|---|---|
| G1/G3 | 1.25 | 1.30 | 1.20 |
| G2/G3 | 1.30 | 1.25 | 1.20 |
| G4/G3 | 1.30 | 1.20 | 1.20 |
| Maximum land portion width/minimum land portion width | 1.00 | 1.00 | 1.00 |
| Circumferential narrow groove in outer shoulder land portion So | No | No | No |
| Circumferential narrow groove in inner shoulder land portion Si | No | No | No |
| Gs/G3 | — | — | — |
| Circumferential narrow groove in inner land portion Ri | No | No | No |
| Gr/G3 | — | — | — |
| D2/D1 | — | — | — |
| Lug grooves in inner land portion Ri | No | No | No |
| W1/W2 | — | — | — |
| Lug grooves in shoulder land portions Si and So | No | No | No |
| Sipes in outer shoulder land portion So | No | No | No |
| Communication/no communication with lug grooves | — | — | — |
| Dry steering stability performance | 103 | 103 | 103 |
| Wet steering stability performance | 100 | 100 | 100 |
| Noise performance | 103 | 97 | 97 |

| | Example 3 | Example 4 | Example 5 | Example 6 |
|---|---|---|---|---|
| G1/G3 | 1.10 | 1.10 | 1.05 | 1.10 |
| G2/G3 | 1.20 | 1.40 | 1.30 | 1.20 |
| G4/G3 | 1.15 | 1.20 | 1.10 | 1.30 |
| Maximum land portion width/minimum land portion width | 1.00 | 1.00 | 1.00 | 1.00 |
| Circumferential narrow groove in outer shoulder land portion So | No | No | No | No |
| Circumferential narrow groove in inner shoulder land portion Si | No | No | No | No |
| Gs/G3 | — | — | — | — |
| Circumferential narrow groove in inner land portion Ri | No | No | No | No |
| Gr/G3 | — | — | — | — |
| D2/D1 | — | — | — | — |
| Lug grooves in inner land portion Ri | No | No | No | No |
| W1/W2 | — | — | — | — |
| Lug grooves in shoulder land portions Si and So | No | No | No | No |

TABLE 1-continued

|  | | | | |
|---|---|---|---|---|
| Sipes in outer shoulder land portion So | No | No | No | No |
| Communication/no communication with lug grooves | — | — | — | — |
| Dry steering stability performance | 103 | 102 | 103 | 103 |
| Wet steering stability performance | 100 | 100 | 100 | 100 |
| Noise performance | 103 | 102 | 104 | 103 |

TABLE 2

|  | Example 7 | Example 8 | Example 9 | Example 10 |
|---|---|---|---|---|
| G1/G3 | 1.10 | 1.10 | 1.20 | 1.20 |
| G2/G3 | 1.25 | 1.25 | 1.25 | 1.25 |
| G4/G3 | 1.20 | 1.20 | 1.30 | 1.30 |
| Maximum land portion width/minimum land portion width | 1.00 | 1.00 | 1.00 | 1.05 |
| Circumferential narrow groove in outer shoulder land portion So | No | No | No | No |
| Circumferential narrow groove in inner shoulder land portion Si | Yes | Yes | Yes | Yes |
| Gs/G3 | 0.10 | 0.20 | 0.30 | 0.20 |
| Circumferential narrow groove in inner land portion Ri | No | No | No | No |
| Gr/G3 | — | — | — | — |
| D2/D1 | — | — | — | — |
| Lug grooves in inner land portion Ri | No | No | No | No |
| W1/W2 | — | — | — | — |
| Lug grooves in shoulder land portions Si and So | No | No | No | No |
| Sipes in outer shoulder land portion So | No | No | No | No |
| Communication/no communication with lug grooves | — | — | — | — |
| Dry steering stability performance | 104 | 105 | 105 | 105 |
| Wet steering stability performance | 101 | 100 | 101 | 101 |
| Noise performance | 104 | 105 | 105 | 105 |

|  | Example 11 | Example 12 | Example 13 | Example 14 |
|---|---|---|---|---|
| G1/G3 | 1.20 | 1.20 | 1.20 | 1.10 |
| G2/G3 | 1.25 | 1.25 | 1.25 | 1.25 |
| G4/G3 | 1.30 | 1.30 | 1.30 | 1.20 |
| Maximum land portion width/minimum land portion width | 1.10 | 1.00 | 1.00 | 1.00 |
| Circumferential narrow groove in outer shoulder land portion So | No | No | No | No |
| Circumferential narrow groove in inner shoulder land portion Si | Yes | Yes | Yes | Yes |
| Gs/G3 | 0.20 | 0.20 | 0.20 | 0.20 |
| Circumferential narrow groove in inner land portion Ri | No | Yes | Yes | Yes |
| Gr/G3 | — | 0.10 | 0.10 | 0.20 |
| D2/D1 | — | 0.15 | 0.30 | 0.20 |
| Lug grooves in inner land portion Ri | No | No | No | Yes |
| W1/W2 | — | — | — | 1.00 |
| Lug grooves in shoulder land portions Si and So | No | No | No | No |
| Sipes in outer shoulder land portion So | No | No | No | No |
| Communication/no communication with lug grooves | — | — | — | — |
| Dry steering stability performance | 104 | 104 | 105 | 105 |
| Wet steering stability performance | 101 | 101 | 101 | 101 |
| Noise performance | 104 | 105 | 104 | 105 |

TABLE 3

|  | Example 15 | Example 16 | Example 17 | Example 18 |
|---|---|---|---|---|
| G1/G3 | 1.10 | 1.10 | 1.10 | 1.10 |
| G2/G3 | 1.25 | 1.25 | 1.25 | 1.25 |

TABLE 3-continued

|  | | | | |
|---|---|---|---|---|
| G4/G3 | 1.20 | 1.20 | 1.20 | 1.20 |
| Maximum land portion width/minimum land portion width | 1.00 | 1.00 | 1.00 | 1.00 |
| Circumferential narrow groove in outer shoulder land portion So | No | No | No | No |
| Circumferential narrow groove in inner shoulder land portion Si | Yes | Yes | Yes | Yes |
| Gs/G3 | 0.20 | 0.20 | 0.20 | 0.20 |
| Circumferential narrow groove in inner land portion Ri | Yes | Yes | Yes | Yes |
| Gr/G3 | 0.20 | 0.20 | 0.20 | 0.20 |
| D2/D1 | 0.20 | 0.20 | 0.20 | 0.20 |
| Lug grooves in inner land portion Ri | Yes | Yes | Yes | Yes |
| W1/W2 | 0.35 | 0.20 | 0.60 | 0.35 |
| Lug grooves in shoulder land portions Si and So | No | No | No | Yes |
| Sipes in outer shoulder land portion So | No | No | No | No |
| Communication/no communication with lug grooves | — | — | — | Communication |
| Dry steering stability performance | 105 | 105 | 105 | 105 |
| Wet steering stability performance | 103 | 107 | 105 | 105 |
| Noise performance | 105 | 103 | 105 | 105 |

|  | Example 19 | Example 20 | Example 21 |
|---|---|---|---|
| G1/G3 | 1.10 | 1.10 | 1.20 |
| G2/G3 | 1.25 | 1.25 | 1.25 |
| G4/G3 | 1.20 | 1.20 | 1.30 |
| Maximum land portion width/minimum land portion width | 1.00 | 1.00 | 1.00 |
| Circumferential narrow groove in outer shoulder land portion So | No | No | No |
| Circumferential narrow groove in inner shoulder land portion Si | Yes | Yes | Yes |
| Gs/G3 | 0.20 | 0.20 | 0.30 |
| Circumferential narrow groove in inner land portion Ri | Yes | Yes | Yes |
| Gr/G3 | 0.30 | 0.20 | 0.20 |
| D2/D1 | 0.20 | 0.20 | 0.20 |
| Lug grooves in inner land portion Ri | Yes | Yes | Yes |
| W1/W2 | 0.50 | 0.35 | 0.35 |
| Lug grooves in shoulder land portions Si and So | Yes | Yes | Yes |
| Sipes in outer shoulder land portion So | No | Yes | Yes |
| Communication/no communication with lug grooves | Communication | No communication | No communication |
| Dry steering stability performance | 105 | 105 | 105 |
| Wet steering stability performance | 107 | 105 | 107 |
| Noise performance | 103 | 110 | 108 |

The invention claimed is:

1. A pneumatic tire comprising a mounting direction indicator portion indicating a mounting direction of a tire with respect to a vehicle; and a tread surface in which an outer side and an inner side in a vehicle width direction are asymmetric with respect to a tire equatorial plane;

the tread surface comprising a first main groove extending in a tire circumferential direction at a position outward of the tire equatorial plane in the vehicle width direction, a second main groove extending in the tire circumferential direction at a position closer to the tire equatorial plane than the first main groove, a third main groove extending in the tire circumferential direction at a position inward of the tire equatorial plane in the vehicle width direction, and a fourth main groove extending in the tire circumferential direction at a position farther from the tire equatorial plane than the third main groove, a second narrow groove provided in an inner land portion between the third main groove and the fourth main groove and extending in the tire circumferential direction, a rib extending continuously in the tire circumferential direction provided between the second narrow groove and the third main groove and no grooves provided between the second narrow groove and the third main groove;

relationships 1.05≤G1/G3≤1.25, 1.20≤G2/G3≤1.40, and 1.10≤G4/G3≤1.30 being satisfied; and relationships G3<G1<G2 and G3<G1<G4 being satisfied, where G1 is a groove width of the first main groove, G2 is a groove width of the second main groove, G3 is a groove width of the third main groove, and G4 is a groove width of the fourth main groove.

2. The pneumatic tire according to claim 1, wherein the groove width G2 of the second main groove and the groove width G4 of the fourth main groove have a relationship G4<G2.

3. The pneumatic tire according to claim 1, wherein the groove width G1 of the first main groove, the groove width G2 of the second main groove, and the groove width G3 of the third main groove have a relationship (G2−G1)/G3≥0.01.

4. The pneumatic tire according to claim 1, wherein
for a width of an outer land portion between the first main groove and the second main groove, a width of a central land portion between the second main groove and the third main groove, and a width of the inner land portion between the third main groove and the fourth main groove, a ratio of a maximum width to a minimum width is less than or equal to 1.05.

5. The pneumatic tire according to claim 1, wherein
for a width of an outer land portion between the first main groove and the second main groove, a width of a central land portion between the second main groove and the third main groove, and a width of an inner land portion between the third main groove and the fourth main groove, at least one of the widths is different from the other widths.

6. The pneumatic tire according to claim 1, further comprising a first narrow groove extending in the tire circumferential direction at a position further inward than the fourth main groove in the vehicle width direction, wherein a groove width Gs of the first narrow groove and the groove width G3 of the third main groove have a relationship $0.10 \leq Gs/G3 \leq 0.30$.

7. The pneumatic tire according to claim 1, further comprising a second lug groove at a first end opening to the first main groove and at a second end extending outward in the vehicle width direction; and a sipe at a first end connected to the second end of the second lug groove and at a second end extending outward in the vehicle width direction.

8. The pneumatic tire according to claim 1, further comprising a third lug groove extending outward in the vehicle width direction from a position further outward than the first main groove in the vehicle width direction; and a fourth lug groove extending inward in the vehicle width direction from a position further inward than the fourth main groove in the vehicle width direction, wherein
the third lug groove does not open to the first main groove, and
the fourth lug groove does not open to the fourth main groove.

9. The pneumatic tire according to claim 1, wherein
a distance from the tire equatorial plane to the second main groove is shorter than a distance from the tire equatorial plane to the third main groove.

10. The pneumatic tire according to claim 1, wherein the second narrow groove extends continuously without interruption in the tire circumferential direction.

11. The pneumatic tire according to claim 1, wherein a groove width Gr of the second narrow groove and the groove width G3 of the third main groove have a relationship $0.10 \leq Gr/G3 \leq 0.30$.

12. The pneumatic tire according to claim 11, wherein
in the inner land portion, the second narrow groove is provided at a position where a ratio of a distance from the third main groove to a length of the inner land portion in the vehicle width direction is more than or equal to 0.15 and less than or equal to 0.30.

13. The pneumatic tire according to claim 12, further comprising a first lug groove at a first end opening to the second narrow groove and at a second end opening to the fourth main groove.

14. The pneumatic tire according to claim 13, wherein
the first lug groove has a groove width varying between the first end and the second end, and
a relationship between a groove width W1 on the first end side and a groove width W2 on the second end side is in the range $0.20 < W1/W2 < 0.60$.

* * * * *